United States Patent [19]
Long

[11] Patent Number: 5,824,274
[45] Date of Patent: Oct. 20, 1998

[54] OZONE TREATMENT SYSTEM FOR POINT OF USE PURIFICATION OF WATER AND SANITIZING AGENT FOR SURFACES, ARTICLES AND FOODS

[76] Inventor: Ron Long, 122 Scott River Rd., Fort Jones, Calif. 96032

[21] Appl. No.: 790,281

[22] Filed: Jan. 28, 1997

[51] Int. Cl.⁶ .............................. B01J 19/08; C02F 1/78
[52] U.S. Cl. ................. 422/186.07; 422/186.18; 422/186.08; 422/186.1; 422/186.12; 422/186.14; 422/186.15; 422/186.16
[58] Field of Search ............... 422/186.07, 186.18, 422/186.08, 186.1, 186.12, 186.14, 186.15, 186.16; 204/176

[56] References Cited

U.S. PATENT DOCUMENTS

| | | | |
|---|---|---|---|
| Re. 34,571 | 3/1994 | Uys | 422/186.07 |
| 788,557 | 5/1905 | Sahlstrom . | |
| 919,403 | 4/1909 | Vosmaer . | |
| 919,445 | 4/1909 | Lohman . | |
| 1,136,227 | 4/1915 | Goldberg . | |
| 1,403,025 | 1/1922 | Haase . | |
| 1,796,110 | 3/1931 | Lechler . | |
| 3,766,051 | 10/1973 | Bollyky | 204/321 |
| 3,942,020 | 3/1976 | Ciambrone | 250/539 |
| 4,214,995 | 7/1980 | Saylor | 250/539 |
| 4,216,096 | 8/1980 | Paréet al. | 250/539 |
| 4,603,031 | 7/1986 | Gelbman . | |
| 4,614,573 | 9/1986 | Masuda . | |
| 4,619,763 | 10/1986 | O'Brien . | |
| 4,656,010 | 4/1987 | Leitzke et al. | 422/186.18 |
| 4,690,803 | 9/1987 | Hirth . | |
| 4,696,800 | 9/1987 | Sasaki et al. | 422/186.18 |
| 4,725,412 | 2/1988 | Ito | 422/186.19 |
| 4,764,349 | 8/1988 | Arff et al. | 422/186.18 |
| 4,790,980 | 12/1988 | Erni et al. . | |
| 4,834,948 | 5/1989 | Schmiga et al. | 422/186.19 |
| 4,960,570 | 10/1990 | Mechterscheimer | 422/186.21 |
| 4,963,331 | 10/1990 | Mouw | 422/186.18 |
| 4,981,656 | 1/1991 | Leitzke | 422/186.18 |
| 5,008,087 | 4/1991 | Batchelor | 422/186.22 |
| 5,009,858 | 4/1991 | Mechtersheimer . | |
| 5,089,098 | 2/1992 | Tacchi | 204/176 |
| 5,093,087 | 3/1992 | Freeman | 422/186.15 |
| 5,102,629 | 4/1992 | Hayashi et al. | 422/186.18 |
| 5,258,165 | 11/1993 | Olsen . | |
| 5,268,151 | 12/1993 | Reed, deceased et al. | 422/186.16 |
| 5,348,709 | 9/1994 | Wheatley | 422/186.18 |
| 5,437,843 | 8/1995 | Kuan | 422/186.07 |
| 5,501,844 | 3/1996 | Kasting, Jr. et al. . | |
| 5,503,809 | 4/1996 | Coate et al. | 422/186.18 |
| 5,545,379 | 8/1996 | Gray . | |
| 5,552,125 | 9/1996 | Chamblee et al. | 422/186.07 |
| 5,630,990 | 5/1997 | Conrad et al. | 422/186.07 |

*Primary Examiner*—Daniel J. Jenkins
*Attorney, Agent, or Firm*—Bryan Cave LLP

[57] ABSTRACT

An water purifier and surface sanitizer uses an ozone generator but requires no air dryer, is adapted for simple maintenance and for use in remote areas from low-voltage DC. The sanitizer has a housing with a high-voltage supply device such as a pulse coil, coupled directly to a tubular inner electrode. A dielectric tube of borosilicate glass (e.g. PYREX) is shaped like a test tube with one open end, and slides over the inner electrode with a push fit. The dielectric tube is easy to clean since it is can be nulled off the inner electrode, cleaned with acid/neutralizer or detergent to remove built-up surface-contaminants, and replaced; this avoids any need for an air dryer. An outer electrode includes an air space (corona space) and gaps for ventilation. Air passes over the dielectric, becoming ozonated by the high voltage, and is drawn into a water stream by a venturi. The water may also pass through a particle filter. The water flow is controlled by an fully-on or fully-off faucet.

12 Claims, 5 Drawing Sheets

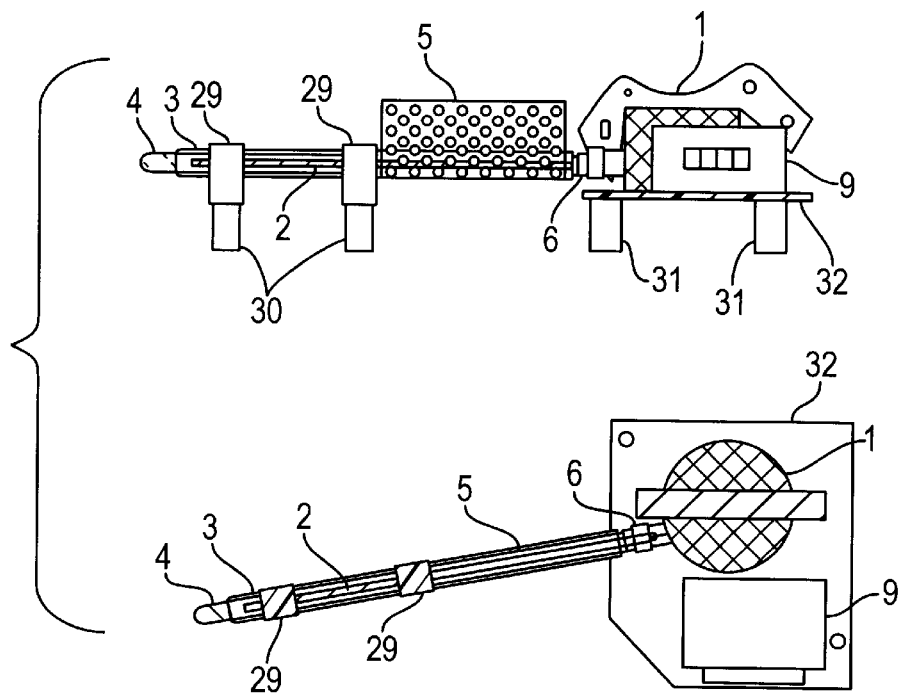
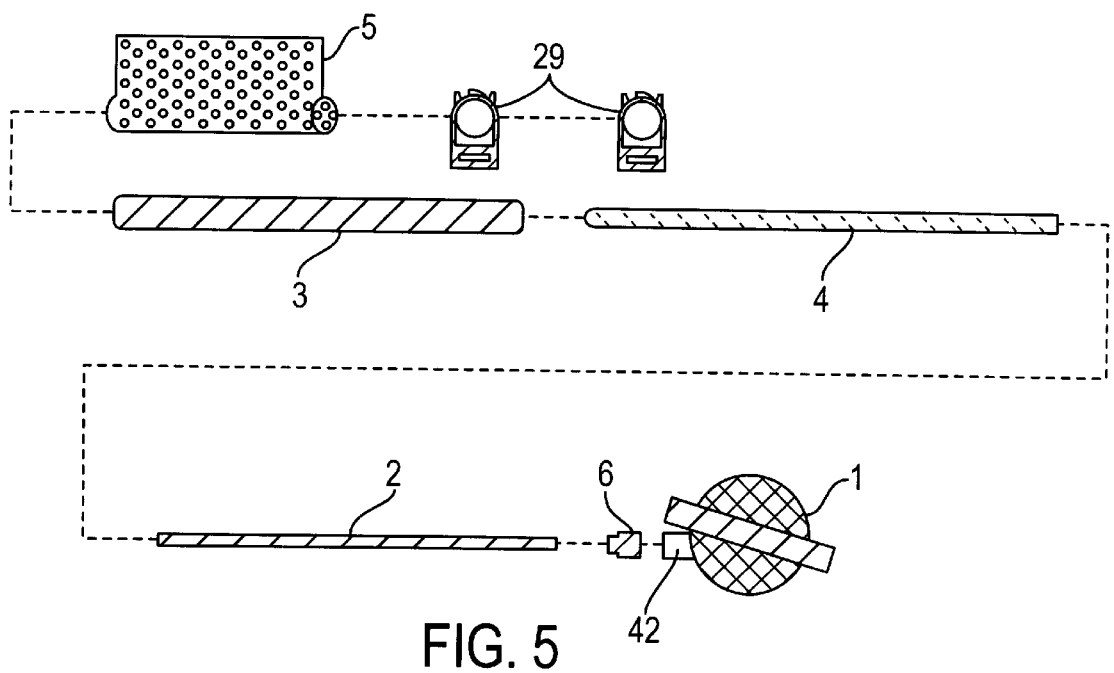
FIG. 4
FIG. 5

OZONE TREATMENT SYSTEM FOR POINT OF USE PURIFICATION OF WATER AND SANITIZING AGENT FOR SURFACES, ARTICLES AND FOODS

CROSS-REFERENCE TO RELATED APPLICATION

This application claims the benefit of U.S. Provisional application Ser. No. 60/028,142 filed on Oct. 16, 1996.

FIELD OF THE INVENTION

The present invention relates to the use of ozone as a post-sterilizer for point of use undercounter and countertop drinking water treatment, such as filtration and reverse osmosis, and as a sanitizer for surfaces, articles and foods, and in particular to a corona discharge ozone generator and ozone injection and water dispensing devices configured for such purpose which are easily maintained and economical to manufacture and to operate. Even more particularly the present invention provides an ozone generation electrode assembly for use in such a device which is easily and quickly disassembled for cleaning.

BACKGROUND OF INVENTION

Ozone is an allotropic form of oxygen which is produced in nature by the exposure of oxygen molecules (O2) to ultraviolet light or to the high voltage associated with lightning. Such exposure breaks apart the oxygen molecules into monatomic oxygen and recombines a portion of the oxygen atoms and molecules to form ozone (O3). Manmade ozone is created by the passage of dry, ambient air or pure oxygen either past a source of ultraviolet light or through an electrical discharge, commonly called a corona, which is produced by an electric charge between parallel or concentric electrodes separated by a dielectric to prevent a spark discharge. Ozone produced by corona discharge typically is of a higher concentration than ozone produced by ultraviolet light, thus is rendered more useful for oxidation and purification applications such as may be employed for treatment of liquids and surfaces. The formation of ozone via the corona discharge method has a concurrent formation of nitrous compounds, which, in the presence of moist air, precipitate small amounts of nitric acid inside the ozone generation chambers. Therefore, air dryers producing very low dewpoint air are typically employed along with the ozone generator to prevent the acid precipitation from fouling dielectrics and reducing ozone production capabilities.

Ozone is a highly reactive oxidizer, the application of which as a sterilizing and preserving agent is well known. It is the most powerful disinfectant commonly available for water treatment and is capable of destroying bacteria up to 3,125 times faster than chlorine. Its ability to destroy such bacteria as *E. Coli* virtually on contact is well documented as is its effectiveness against such germs as staphylococcus and salmonella. The bottled water industry, together with the US Food and Drug Administration and many state health agencies which regulate bottled water production, recognize the purification and post-sanitizing efficiency of ozone and specify that an ozone residual in bottled water shall be between 0.1 and 0.4 Parts Per Million. Ozone's ability to minimize microbiological contamination on the surfaces of meat, cheese, eggs, poultry, fruits, vegetables and so forth has been known since the early $20^{th}$ century. The resulting extension of shelf life of such items has made ozone a valuable adjunct to modern food processing and storage operations. More recently, in studies by the Clemson University Department of Dairy Science, ozone has been proven to be a powerful sterilizer and sanitizer of microbiologically contaminated surfaces which have been subjected to a stream of ozonated water. Unlike chemical sanitizers, ozone leaves no chemical residue on treated surfaces, thus it is a highly desirable technology for use in small commercial applications, such as restaurants, and in personal household use for rinsing such items as dishes, cuttingboards, utensils, kitchen sponges, meat trays and so forth. Additionally, when preceded by such water treatment as carbon and low micron fine filtration, or as reverse osmosis, an ozone residual may be created in the treated water to enhance the microbiological integrity of the water for drinking, cooking and other uses. Technical articles in the literature have recognized the efficacy of combining pre-filtration with ozone post-treatment for controlling cysts such as cryptosporidium and giardia.

Although numerous devices have been developed for using ozone as a water purifier, their design, function and expense have served to limit the use of ozone as an efficient and effective point- of-use sterilizing and sanitizing method for small household and commercial applications.

In particular, the methods of creating ozone and of dissolving it in the water have been inefficient, maintenance intensive, expensive and/or have involved the use of potentially dangerous high alternating current transformers in close proximity to water supply lines.

One of the greatest drawbacks of small undercounter or countertop ozone systems has been the use of air dryers to prevent the build up of nitric acid on ozone generator dielectrics. Small air dryers for such applications typically have consisted of containers of silica gel, molecular sieve or similar moisture absorbing agents. These agents must be regenerated frequently via the application of high heat. This regeneration necessity contributes to an excessive maintenance task which is impractical for the average household or small commercial operation. Although automatically regenerating air dryers are available, they are generally too expensive to make such a system practical from a marketing point of view.

Another drawback for previously designed systems has been the method of dissolving ozone in the water. The two primary methods employed have been bubbling ozone into a container of water or using a venturi injector to draw the ozone into a stream of water. The first of these two methods, bubbling, creates limitations as to the amount of water that can be treated during a given time period since it relies on the complete direct contact of virtually every molecule of water with ozone molecules. This time factor precludes bubbling as a practical method for purifying a continuous stream of water. The second method cited, venturi injection, can be highly efficient, but previous attempts to apply ozone have not addressed efficient injection design. The technology requires a very specific pressure differential across the venturi in order for, first, the ozone to be drawn into the water and, second, for the ozone to be thoroughly dissolved in the water for maximum microbiological and oxidative effect. The general function parameters of a venturi-based ozone injection system require carefully controlled pressure factors both upstream and down stream of the injector. Standard in the previous art has been the use of either a flow switch or a pressure switch to activate the ozone generator. Flow switches create a significant pressure drop which impacts on the ability of the venturi to draw and mix ozone efficiently. Pressure switches are problematic due to the wide variation in available pressure in specific local applications, necessitating frequent pressure switch adjustments or, in the case of minimal pressure below 30 PSI, failure of the pressure switch to function at all.

A major limitation of venturi-based ozone systems has been the lack of a downstream faucet or dispenser valve which maintains adequate free flow without creating a back pressure that defeats the ability of the venturi to draw in ozone and dissolve it thoroughly.

Another shortcoming of previous art in the design of small undercounter and countertop ozone systems has been the use of high voltage alternating current transformers, typically producing upwards of 4,000 volts. Inasmuch as these transformers must be in close proximity to the ozone generation electrodes, which, in turn, must be in close proximity to the water being treated, hazardous conditions are presented which make such systems unacceptable for household or small commercial applications. Alternating current-based ozone systems also cannot be utilized in remote applications, such as emergency water purification or solar powered water purification, without the addition of expensive power converters.

What is needed in the art is an ozone system which will reliably produce ozone for drinking water and sanitizing purposes, which is inexpensive to manufacture and operate, which is very simple to maintain, which provides intrinsically safe electrical operation, reliable on-off capability independent of pressure or flow, and which is capable of injecting, dissolving and dispensing a consistent ozone level according to bottled water standards sufficient to promote microbiological integrity in the water so dispensed and on surfaces rinsed with it. Furthermore, what is needed is such as a system that allows the flexibility of having filtration as an integral component of the system or of applying the ozone generation, injection and dispensing capability to existing filtration or reverse osmosis treatment systems. Also what is needed is a system as described above that will lend itself to remote emergency water purification, as well as solar powered water purification.

SUMMARY OF INVENTION:

Accordingly, the present invention has an object, among others, to overcome deficiencies in the prior art such as noted above.

The present invention relates to a point-of-use filtration and ozonation water treatment and surface sanitizing process wherein ozone is created by a corona discharge electrode, which utilizes pulsed, low direct current voltage between 12 and 24 volts DC, that is easily accessed and cleaned, thereby avoiding the necessity of an air dryer, and that provides a unique interface with a high voltage DC power coil which allows compact design and simple assembly. This invention also includes a method of venturi injection and water dispensing which maintains sufficient ozone residual between 0.1 and 0.4 Parts Per Million for assuring microbiological integrity for drinking water and for rinsing surfaces, articles and food items.

The process system of this invention is attached to a cold water supply line with the use of a saddle tee valve, a piercing valve, slip joint adapter or any similar commonly available undercounter water diverter valves, the application of which is well known in the art. Alternatively, water may be supplied to the system by a pump (not shown) capable of delivering at least ¾ Gallon Per Minute at a minimum of 30 PSI pressure. Water from the cold water supply line is thereby diverted by way of a flexible hollow tube, such as is commonly utilized in the art for the communication of water, to the system into a first filter sump containing an internal filtration cartridge, the composition of which may be one of many commonly available materials designed to remove from water particulate material in the nominal size of one micron or larger and which also may contain a form of carbon for reduction of chemicals, such as chlorine, chlorine compounds, lead and organic compounds. Following passage through the first filter sump and cartridge, the water exits the sump through its outflow port and enters a second sump and filter cartridge arrangement, which is similar in design to the first. The cartridge in the second sump however is designed for removal of materials and microbial life forms of a size exceeding an absolute one micron or greater. Filter cartridges specifically intended for such utilization are common and well known in the art, therefore will not be described further here.

After filtration steps as specified are complete, the filtered water enters the enclosure of the present invention by way of a compression or barbed fitting to which a flexible tube exhibiting an inside diameter of ⅛ inch or greater is attached. The water passes through a length of said tubing until it reaches a venturi thereby providing a motive force creating suction at the gas intake port of the venturi. The venturi draws in ozone gas mixture and dissolves it in the water stream. The ozonated water passes to a dispensing point which may be a valve or water faucet fixture exhibiting the quality of low resistance to water flow. The water so treated by the present invention then may be used for drinking, cooking and so forth. It may also be used, by virtue of its retained ozone residual, to rinse surfaces, articles and foods to reduce microbiological contamination thereof.

In another preferred embodiment of the present invention, the filtration components as described above, are separately mounted remote from the ozone generation and injection component housing of the present invention. Connection to the water intake port of the invention is made from the filtered water output port of the filtration or reverse osmosis system. Thus, the present invention permits the application of dissolved ozone for post-treatment use with pre-existing filtration or reverse osmosis systems.

In another preferred embodiment of the present invention, the system as described above may be connected to a 12 volt direct current water pump which will provide the motive force for water to be processed through the system. Power to the system itself may be supplied by any 12 volt direct current source, such as an automotive battery, an automobile cigarette lighter plug receptacle or a solar powered battery. In this preferred embodiment, the present invention may be utilized for remote water purification or for emergency water purification.

BRIEF DESCRIPTION OF DRAWINGS:

The above and other objects and the nature and advantages of the present invention will become more apparent from the following detailed description of an embodiment[s] taken in conjunction with drawings, wherein:

FIG. 4 illustrates the ozone generation components of the present invention, including frontal view and overhead view.

FIG. 5 illustrates an exploded detail view of the ozone generation electrode and its connection to the pulse coil.

DETAILED DESCRIPTION OF INVENTION

Figure 1:
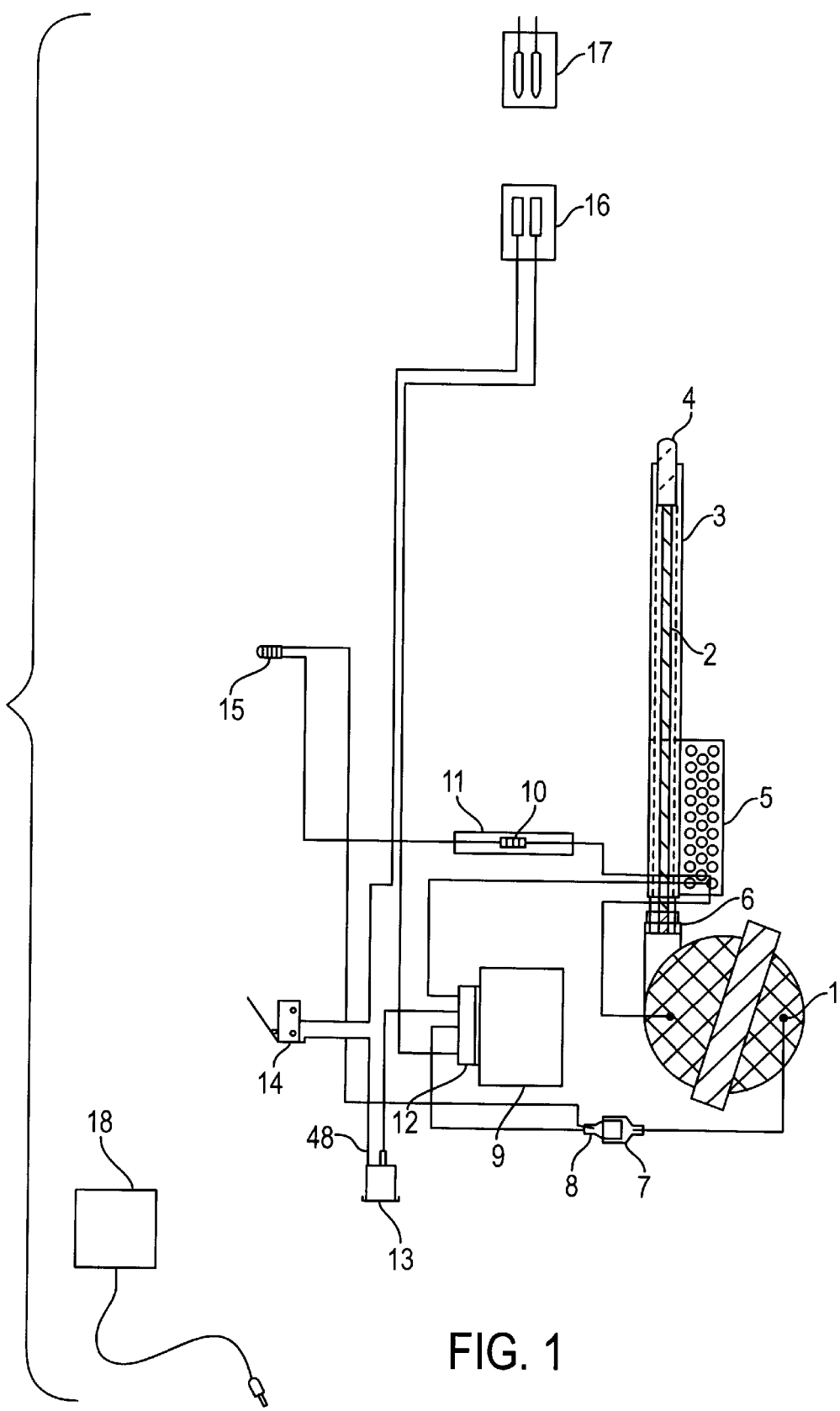
FIG. 1 illustrates the electronic wiring and circuitry of the present invention.
Figure 2:
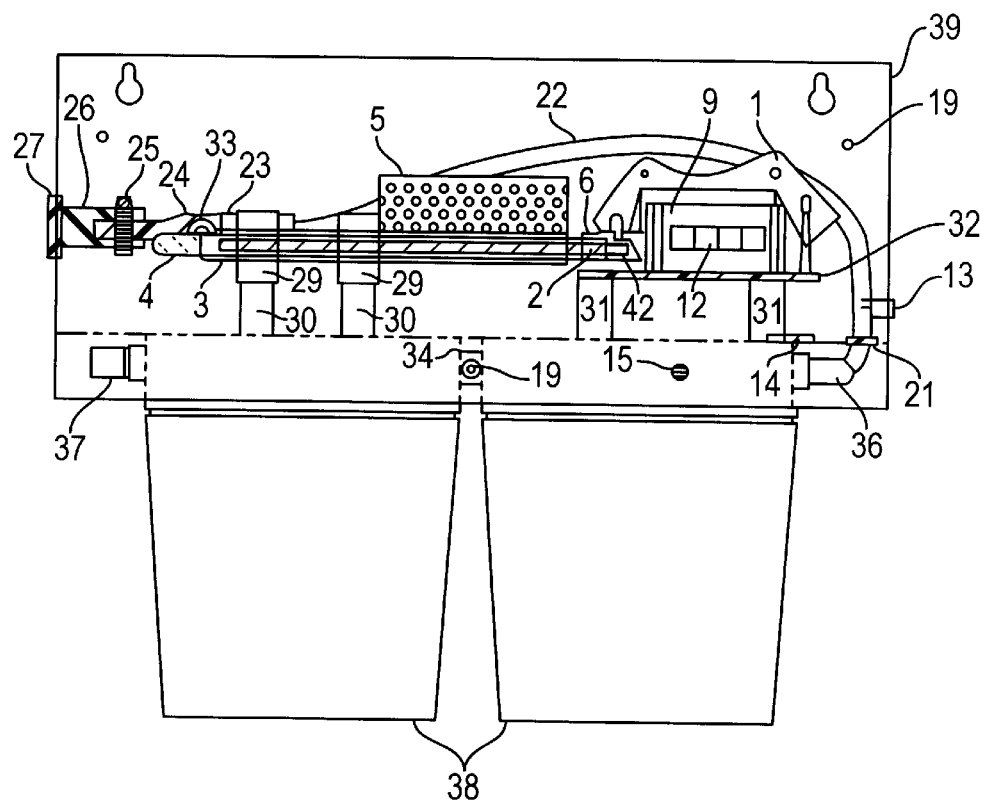
FIG. 2 illustrates the frontal view of the present invention showing locations of filter sumps and the ozone generation and injection assemblies.
Figure 3:
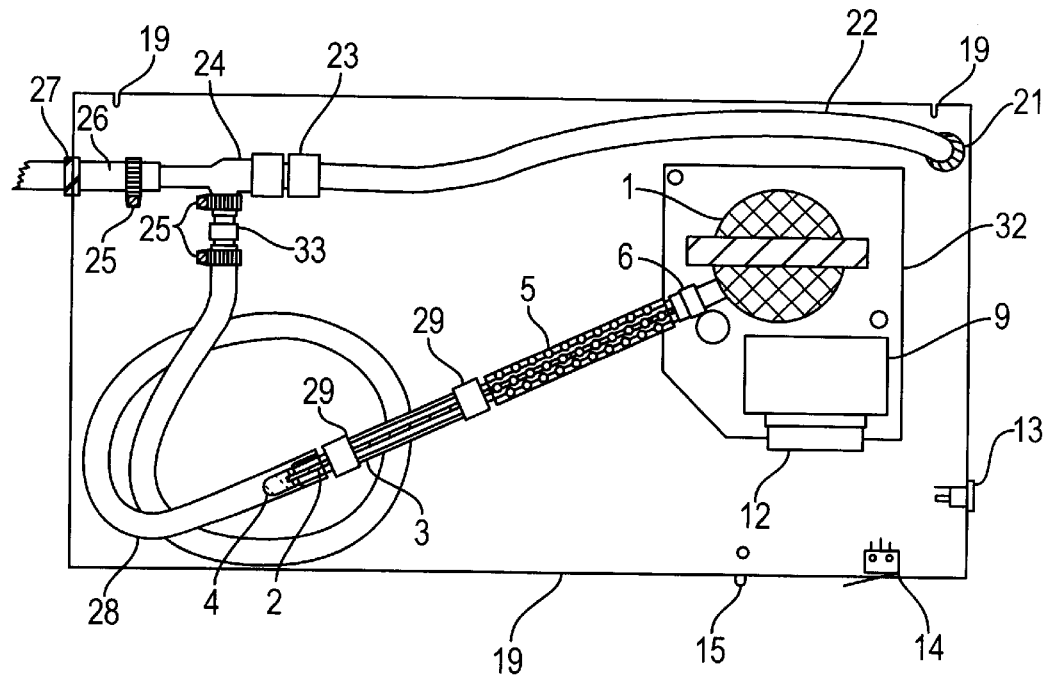
FIG. 3 illustrates an overhead view of the ozone generation and injection assemblies of the present invention.
Figure 6:
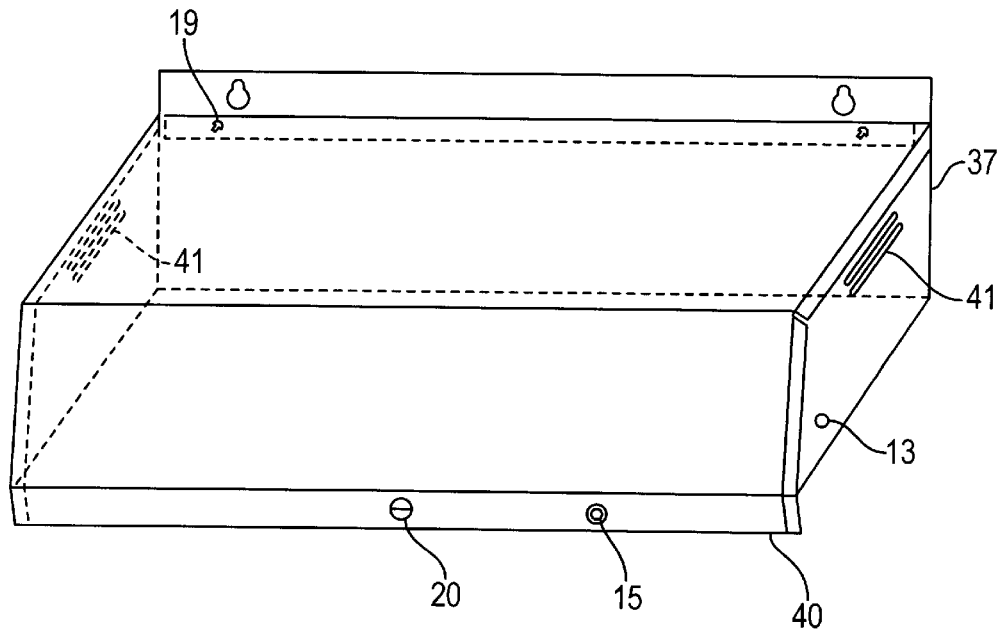
FIG. 6 illustrates the housing of a preferred embodiment of the present invention.
Figure 7:
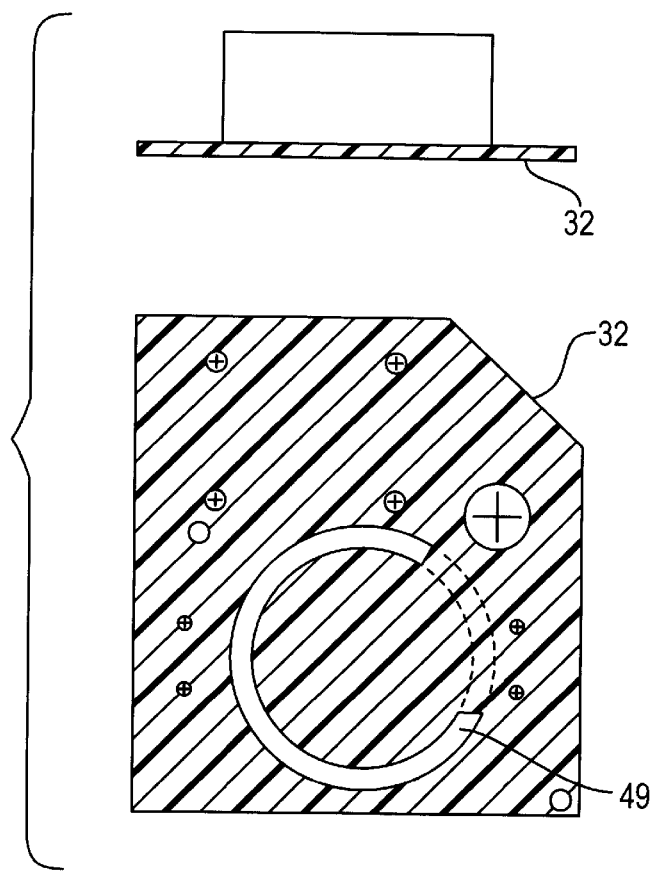
FIG. 7 illustrates the non-conductive mounting plate which supports the pulse coil and the transistorized circuitry of the ozone generator of the present invention.
Figure 8:
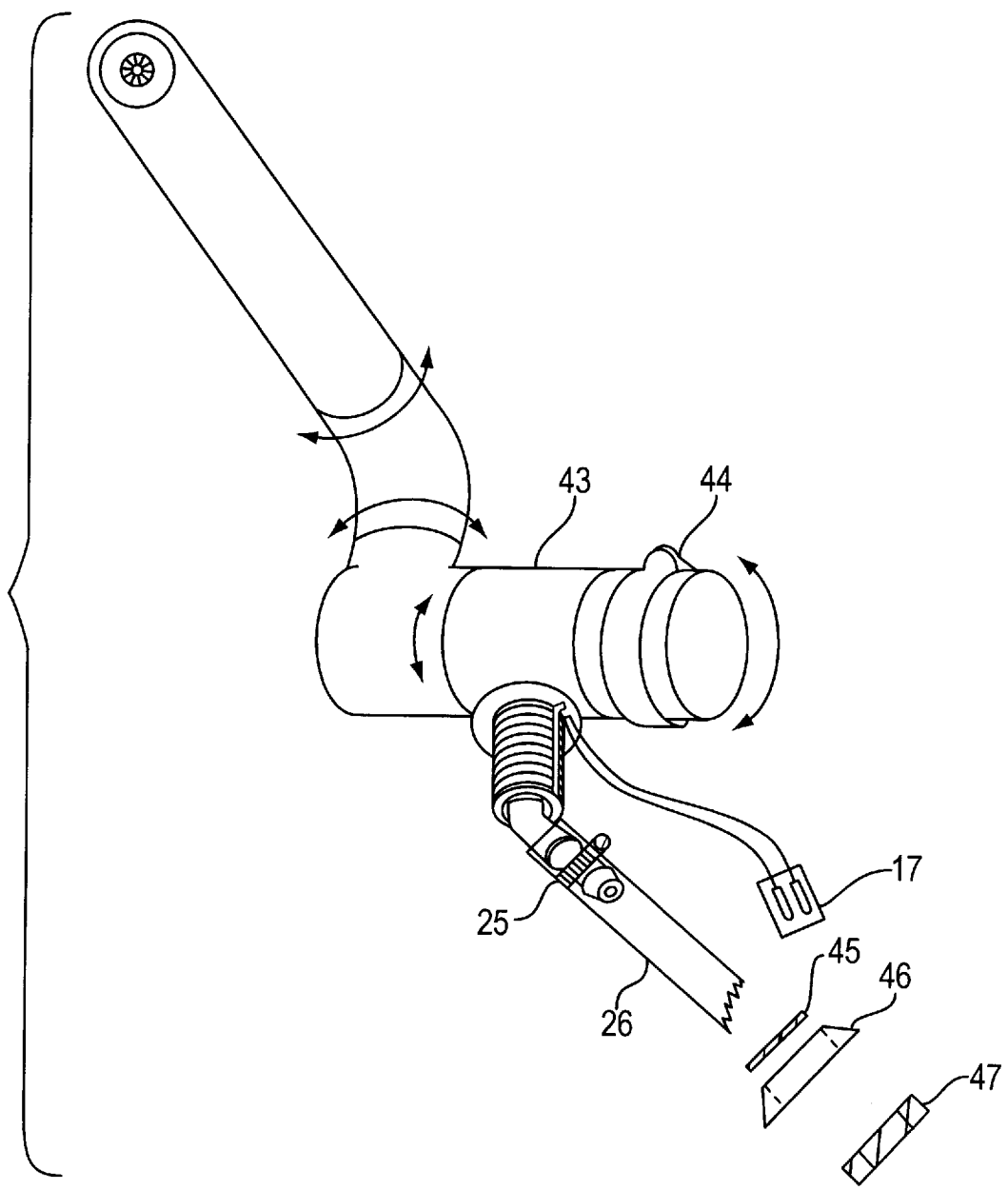
FIG. 8 illustrates the water faucet fixture of the present invention.

In a preferred best mode embodiment, this invention consists of a metal or plastic housing 39 with a removable top cover 40 affixed to the body of the housing 39 by a self-clinching panel fastener pin 19 and nut 20 positioned at the lower front face of the top cover 40 and affixed by two self-clinching panel fastener pins 19 attached to the rear of the body of the housing which communicate with two holes at the back lip of the top cover 40. The enclosure created by the joining of the top cover 40 and housing body 39 contains the ozone generation electronics 9, pulse coil 1 and ozone generation electrode arrangement 2 THRU 6 together with a venturi injector 24 and flexible tubing 22 for introduction of water into the water intake port 23 of the venturi 24 and another portion of tubing 28 which communicates between the ozone electrode 3 and the gas intake port of the venturi 24. The bottom or floor plate of the housing 39 is perforated to permit the attachment of one, two or three, commonly available filtration sump housings 38. Additional perforations 41 on the two ends of the housing 39 and in the floor of the housing provide convectional air flow across the internal electronics for the purposes of cooling and to prevent condensation.

The ozonated water exit port of the venturi 24 is attached to a length of flexible, food grade, ozone resistant tubing 26, such as Teflon, Norprene, PVC or stainless steel. The ozonated water transfer tubing 26 is affixed on its opposing end to a faucet 43 which is mounted on a sink countertop, or other convenient point of dispensing. Said faucet 43 specifically includes SHURflo Water Faucet Fixture Model 9400900 or Model 9400902, distributed by SHURflo, Santa Ana, California. These two water faucet fixtures exhibit the attributes of full close-full open operation producing nominally low backpressure which is an attribute of the present invention. Included in the handle 44 of the water faucet of the preferred embodiment is a switch which is in communication via electrical wiring 17 & 16 to the ozone generator electronics 9 within the housing 39 described above. The water faucet fixture 43 is affixed to the countertop via faucet spacer 46 on the upper side of the countertop and a washer 45 and faucet nut 47 which secures the faucet in place to the countertop. In a preferred embodiment, the electronic components of the present invention include a power adapter 18 which translates incoming power from 115 Volts AC 60 Hz, or other power as may be locally available such as 220 VAC 50 Hz, to a range of direct current voltages from 12 to 24 VDC 50 or 60 Hz, in a range of milliamps greater than 600 mA. Said adapter 18 may be of wall plug in design or stand alone design, both of which are commonly available and the function of which is well known. Alternatively, the power source for the system may be directly supplied by an automotive 12 volt direct current battery (not shown), or by a solar powered 12 volt direct current battery device (not shown), permitting the present invention additional utility as an emergency or remote water purification device when used in conjunction with a 12 volt DC water pump, such as that manufactured by SHURflo, Santa Ana, Calif., which provides water flow of approximately one gallon per minute at a pressure of 30 to 40 PSI.

The translated power enters the invention housing via a plug-in jack 13 composed of male/female communication, the female connection portion being permanently affixed to the wall of the invention housing. Power is communicated from the plug-in jack 13 via a wiring circuit 48 between the jack 13 and the faucet handle switch 44 through a plug connector comprised of male 17 and female 16 components, one leg of which incorporates a micro-switch 14 which disables power to the generator electronics 9 when the housing cover 40 is removed, to a transistorized circuit board 9 which contains an integrated circuit pulse timer that switches the power on and off several thousand times per second, thereby duplicating the effect of high frequency alternating current, the function and design of which is well known in the art, thus will not be discussed further here. The current then is communicated by means of a wire harness 12 via a male/female spade connector 7 & 8 to high voltage output DC pulse coil 1, specifically, in a preferred embodiment, Model N-185181, which is manufactured for and distributed by Sierra Inc., Litchfield, Ill. The pulse coil 1 in the preferred embodiment consists of a primary coil exhibiting Resistance at 770 mOhm +/−10% and Inductance at 2.3 mH +/−10%, and a secondary coil exhibiting Resistance at 7.15 kohm +/−10% and Inductance at 11 H +/−10%. Transformation ratio of the pulse coil is 1:70.6.

An LED indicator light 15 is provided on a wiring circuit affixed at its one end to the male interface 8 between the transistorized circuit board 9 and the coil 1 and at its other end to a ground point on the negative electrode heat sink 5 via a 1K resistor 10 which is protected by a length of heat shrink tubing 11.

The electronics, including the pulse coil and the transistorized circuit board are attached to a non-conductive plate 32, composed of ABS plastic or other such material, which is raised off the floor of the housing by two or more standoffs 31 which serve the dual functions of maintaining an air space between the housing floor and the electronics for cooling purposes and also maintaining an air insulation against radio frequency wave interference between the housing and the pulse coil. The transistorized circuit board 9 is affixed to the non-conductive plate 32 by means of a pair of slip clamp ties or by snap brackets which hold the circuit board 31 securely in place. The pulse coil 1 is held in place by a concentric ring 49 of ABS or other rigid plastic from which a section is removed sufficient to permit positioning of the power output port of the pulse coil 1 to be aligned with the ozone generator electrode assembly 2 thru 5.

The pulse coil 1 further translates the direct current voltage into high voltage in a range between 300 and 20,000 volts DC, which drives the ozone generator electrode assembly. In the preferred embodiment, the ozone generator utilizes between 1,000 and 2,000 volts DC depending upon the actual input voltage in the range of 12 and 24 volts DC. The electrode assembly is composed of three parts, a positive electrode 2, a dielectric 4 and a negative electrode 3. The positive, internal electrode 2, composed of seamless, stainless steel hollow tubing, is affixed by means of solder or chemical adhesive to an internal power transfer spike 42, which is located in the throat of the pulse coil power output housing 1, which is inserted into the hollow body of said tubing 2. The stainless steel tubing 2 is, in the preferred embodiment, of Type 9RW 316, FDA Approved, (FDA#1213680) seamless medical grade tubing which is typically utilized in the manufacture of hypodermic needles and is manufactured by Vita Needle Company, Needham, Mass.

A hollow dielectric 4, composed of borosilicate glass, which is commonly known as Pyrex, is slid over the outside of the stainless steel positive internal electrode 2, with the inside diameter of the dielectric 4 being as nearly identical to the outside diameter of the internal electrode 2 as possible, yet sufficiently wide enough to permit full insertion of the internal electrode 2 the full length of the dielectric 4. One end of the dielectric 4 is closed and rounded, forming a complete concentric envelopment of one end and the full length of the internal electrode 2. The open end of the dielectric 4 is slid down in-such a fashion that it communicates with the base of the throat of the output housing of the pulse coil 1, forming a protective concentric cover the full length of the internal electrode 2, including the power transfer spike 42 of the pulse coil 1. The dielectric 4 is held in place by friction with the internal electrode 2 and by a concentric flexible boot 6 surrounding the external lip of the output housing of the pulse coil 1.

Concentrically located over length of the borosilicate dielectric 4 is a second length of stainless steel tubing which forms the negative electrode 3 of the ozone generator. The parallel space between the outside diameter of the dielectric 4 and the inside wall of the negative electrode 3 constitute the dielectric gap within which the corona discharge, with its attendant ozone formation, occurs. Each end of the negative electrode 3 is beveled inward to provide for centering of the negative electrode 3 along the length of the dielectric 4. Both ends of the negative electrode 3 are slit to permit air flow through the space between the dielectric 4 and the negative electrode 4. In the preferred embodiment, such slits are four in number and are positioned at 0, 90, 180 and 270 degrees, respectively. The borosilicate dielectric 4 protrudes sufficiently from the end of the external negative electrode 3 to permit the dielectric 4 to be grasped with the fingers and removed for cleaning. The provision of the present invention for simple cleaning of the dielectric 4 is an important improvement in the art, inasmuch as it permits the application of corona discharge ozone generation without the necessity of an air dryer. The negative electrode 3 is held in spatial communication with the throat of the pulse coil 1 by two raised clamps 29 which are affixed to the floor of the housing 39 to maintain a precise alignment between the open length of the negative electrode 3 and the throat of the pulse coil 1. The alignment is such that the dielectric 4 may be removed and reinserted fully in communication with the throat of the pulse coil 1. The positioning of the negative electrode 3 is such that the end nearest the pulse coil 1 is held off a sufficient distance from the power transfer throat of the pulse coil 1 to permit electrical isolation sufficient to prevent arcing between the two components. A portion of the negative electrode 3 is surrounded by a heat sink 5 which is composed of aluminum perforated sheet or other electrically conductive material which draws and dissipates heat created by the generation of the ozone inside the negative electrode 3.

The direct communication between the ozone electrode assembly 2 thru 4 and the pulse coil 1 embodies a unitized construction between the two components which serves to simplify the manufacture and maintenance of the ozone generation device, and is an important improvement in the art.

The end of the negative electrode 3 opposite the pulse coil 1, together with the protruding end of the dielectric 4, is inserted into the flexible ozone transfer tube 28 which is composed of Norprene, Teflon or other similar ozone resistant material, and is held in place by friction between the negative electrode 3 and the ozone transfer tube 28. The ozone transfer tube 28 provides for communication between the ozone electrode assembly 2 thru 4 and the gas intake port of the venturi 24. The ozone transfer tube 28 is comprised of a single section of tubing which is affixed over the tapered end of a check valve 33 designed for a unidirectional flow of ozone to the intake port of the venturi 24. Additionally, the check valve 33 provides for protection of the ozone generation electrode assembly 2 thru 4 against the leakage of water from the venturi 24. The check valve 33 is composed of a chemically resistant material, such as silicone or viton, and the check valve 33 body is composed of similarly resistant materials, such as stainless steel, PVC or acrylic. The opposing end of the check valve 33 is inserted into the gas intake port of the venturi 24 and is secured on each end to the ozone transfer tube 28 and to the gas intake port of the venturi 24 by two hose clamps 25 as described hereafter.

The venturi 24, which is composed of an ozone resistant material, such as high density polyethylene, Kynar, polypropylene, PVC, stainless steel or other such material, and includes a built-in check valve located in the gas intake port, provides suction in the range between 1 and 29 inches of mercury and is constructed according to venturi design which is well known in the art. In the preferred embodiment, the venturi 24 is Model "Vacuum Pump Water PP" #6140–0010 manufactured by Nalge, Inc., Rochester, N.Y., however, other ventures, such as those manufactured by Mazzei Corporation, Bakersfield, Calif., may be equally applied. The ozone transfer tube 28 is attached concentrically over the gas intake port of the venturi 24. It is held in place by a hose clamp 25 which may be of screw closure type or other type common to the art. Material of construction of the clamp 25 is of ozone resistant material such as stainless steel or thermoplastic.

In a preferred embodiment, water enters the system from the cold water supply (not shown) at the inflow point 37 of the first filter housing 38. The first filter contains a filter cartridge which is designed to remove particulate material nominally larger than 1 micron in size from the water stream. The first filter housing exit port is in fluid communication with the intake port of the second filter housing by means of a metal or plastic nipple 34. The second filter housing contains a cartridge which is designed to remove cysts and particulate material at an absolute rating of 1 micron or larger, together with other contaminants including lead, chlorine and organic compounds from the water stream. In application, the types of filter cartridges utilized may be varied at the option of the user to achieve specific contaminant removal capabilities.

The water stream exits the second filter housing exit port which is in fluid communication with the ozone injection venturi by way of a compression fitting 36 to which a food grade flexible tube 22 is attached leading from the second filter 38 through a grommet port 21 to the venturi injector 24. The water is forced through the injector 24, creating a suction at the gas intake port of the venturi 24, which draws in the ozone gas and mixes it with the water. The ozonated water transfer tube 26 is in fluid communication through a grommet port 27 with the water faucet fixture 43 previously described.

When the handle 44 of the water faucet fixture is turned, the electrical switch housed in the handle makes contact through wire circuit 48 to establish power to the ozone generator electronics 9.

Filtered and ozonated water produced by the present invention thereby is available to provide drinking water containing 0.1 to 0.4 parts per million ozone, according to regulations observed by the bottled water industry for ozone disinfectant residual. Additionally, the ozonated water is available to provide a chemical free sanitizing rinse for surfaces, articles and foods.

The foregoing description of the specific embodiments will so fully reveal the general nature of the invention that others can, by applying current knowledge, readily modify and/or adapt for various applications such specific embodiments without undue experimentation and without departing from the generic concept, and therefore, such adaptations and modification should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

One preferred particulate filter is the Quad Flow Cassette Filter, manufactured by International Purity Company of Arlington, Tex., which has a low profile for counter-top devices.

What is claimed is:

1. An ozonating water purifier and surface sanitizer requiring no air dryer, the purifier and surface sanitizer comprising:
   (a) a housing;
   (b) a high-voltage supply at least partially inside the housing;
   a first electrode having an outer diameter and including coupling means for electrically coupling to the high-voltage supply;
   (c) a dielectric tube of glassy material, having an inner diameter and including an internal length sufficient to accept entirely the first electrode;
   (d) a second electrode at least partially surrounding the dielectric tube and including ventilation means for air to pass between the outside of the dielectric tube and the second electrode;
   (e) water flow means for ozonating including venturi means for drawing air through the ventilation means and into a flow of water such that the water is ozonated; and
   (f) easy-cleaning means for axially removing the dielectric tube from the first electrode and the second electrode;
   whereby the dielectric tube may be cleaned without any need for the air dryer.

2. The water purifier and surface sanitizer according to claim 1, wherein the easy-cleaning means comprises:
   an open end of the second electrode comprising means for the dielectric tube to be withdrawn; and
   push-on means for frictionally and removably mounting the dielectric onto the first electrode comprising the inner diameter and the outer diameter.

3. The water purifier and surface sanitizer according to claim 1, wherein the dielectric tube comprises a single closed end distal the coupling means.

4. The water purifier and surface sanitizer according to claim 1, wherein the glassy material includes borosilicate glass.

5. The water purifier and surface sanitizer according to claim 1, wherein the dielectric tube includes a specular surface.

6. The water purifier and surface sanitizer according to claim 1, wherein the coupling means includes a high-voltage spike mounted on the high-voltage supply and the first electrode includes a hollow interior for direct-connection mounting of the first electrode on the high-voltage spike.

7. The water purifier and surface sanitizer according to claim 1, wherein the water flow means comprises a particulate filter.

8. The water purifier and surface sanitizer according to claim 7, wherein the particulate filter includes means for 1-micron absolute filtration.

9. The water purifier and surface sanitizer according to claim 1, wherein the high-voltage supply includes including means for generating high voltage from direct-current low-voltage electricity.

10. The water purifier and surface sanitizer according to claim 9, wherein the high-voltage supply includes a pulse coil.

11. The water purifier and surface sanitizer according to claim 1, wherein the water flow means includes a fully-on/fully-off faucet, whereby a pressure drop across the faucet is constant or zero.

12. The water purifier and surface sanitizer according to claim 11, wherein the faucet includes switching means, coupled to the high-voltage supply, for producing ozone when the faucet is open.

* * * * *